Oct. 29, 1957     C. L. BUTLER     2,811,385

SHOCK DISSIPATING DEVICE

Filed Sept. 6, 1951

INVENTOR:
CLIFFORD L. BUTLER
BY

ATT'YS

United States Patent Office 2,811,385
Patented Oct. 29, 1957

2,811,385

SHOCK DISSIPATING DEVICE

Clifford L. Butler, Wilmette, Ill.

Application September 6, 1951, Serial No. 245,387

4 Claims. (Cl. 293—86)

This invention relates to a device for dissipating the shock caused by the impact of moving objects. More particularly it relates to a shock dissipating and absorbing method and device for dissipating or absorbing the shock of an impact between two moving vehicles or between a moving vehicle and an immovable object.

It has been suggested that springs and other compressible and expansible resilient members may be employed to absorb the shock or force of a blow against a vehicle, for instance, as against the bumpers of an automobile. Considering the great amount of force which is present in a swiftly moving vehicle it will be apparent that a spring capable of absorbing the impact when such a vehicle strikes a stationary object must necessarily be very heavy. It will also be apparent that the compression of such a heavy spring must be followed by decompression thereof with the result that a considerable force will be exerted in the opposite direction, and this force may tend to offset any advantage obtained through the use of the spring.

It is an object of the invention to provide a device for dissipating the force of an impact by using the force to do work.

Another object of the invention is to provide a device for utilizing the force of impact to dissipate at least a part of the force by causing work to be done by a shearing device.

A further object of the invention is to provide a device for dissipating impact force by utilizing the force to perform a shearing operation on shearable members.

Still another object of the invention is to provide a method for dissipating impact force by expending it in a shearing operation.

The foregoing objects and other objects and advantages of the invention will become more apparent following a consideration of the accompanying description and the drawings in which.

By practicing this invention it is now possible to substantially eliminate the crushing and destructive results when a moving object strikes another or a stationary object with considerable force. Specifically, it is now possible to utilize the impact force generated when two moving objects come together to reverse the direction of the objects before substantial damage is done to them. At the same time the invention provides means for dissipating or using up a large part of the impact force by causing the force to operate a shearing machine which is attached to the moving object. Increments of the impact force are used up in the shearing machine by causing the force to drive a shearing member through a shearable, rigidly positioned member. It will be apparent therefore that the extent to which the impact force is used up will depend upon the number of shearable members through which the shearing device passes and the magnitude of the shear-resistance of the various members.

In the following detailed description of the drawings the invention is illustrated in one suitable embodiment thereof. It should be understood, however, that a considerable number of alternative embodiments are contemplated for the invention as will be described in greater detail hereinafter. Consequently it is not intended that the invention should be limited in any way by the following description.

Figure 1:
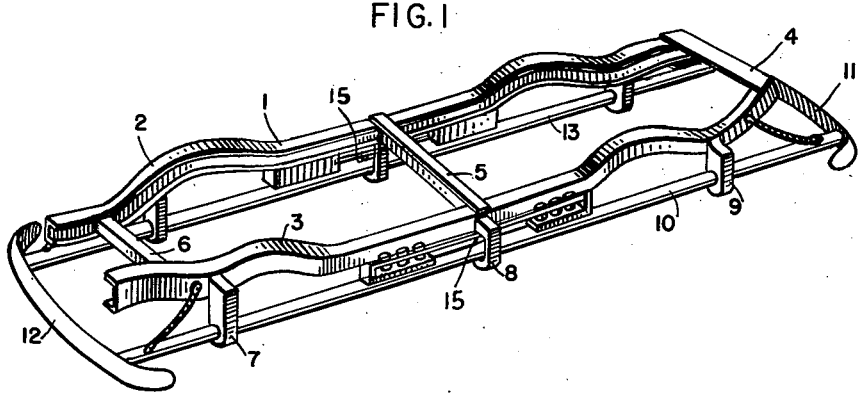
Figure 1 is a perspective view of one embodiment of the invention as applied to an automobile chassis frame.

In Figure 1 the invention is illustrated as it may be applied to the frame of an automobile. The frame 1 may be any conventional design and as illustrated herein consists of a pair of longitudinal channel-shaped members 2 and 3 which are connected at the front, center and rear by the cross members 4, 5 and 6. Since the shock dissipating device attached to each of the channel members 2 and 3 is essentially the same, a description thereof will be limited to one of the shock dissipating members. A series of hangers 7, 8 and 9 extend below the channel member 3 and are attached thereto by any suitable means, such as bolting, riveting or welding. Each of the hangers has an opening near the bottom thereof through which is inserted a longitudinal member 10 which may be in the form of a round, oval, square or rectangular tube or rod. The member 10 fits tightly into the openings in the hangers 7, 8 and 9 so that ordinary small impacts will not displace it therefrom.

Conventional bumpers or impact receiving members 11 and 12 are secured in the usual manner to the longitudinal member 10 and its corresponding longitudinal member 13 on the other side of the frame. At this point the rectangular rigid impact receiving assembly formed by the longitudinal member and the bumpers underlies most of the frame of the automobile but the bumpers extend beyond the ends thereof by an amount only slightly greater than in the conventional automobile.

Figure 2:
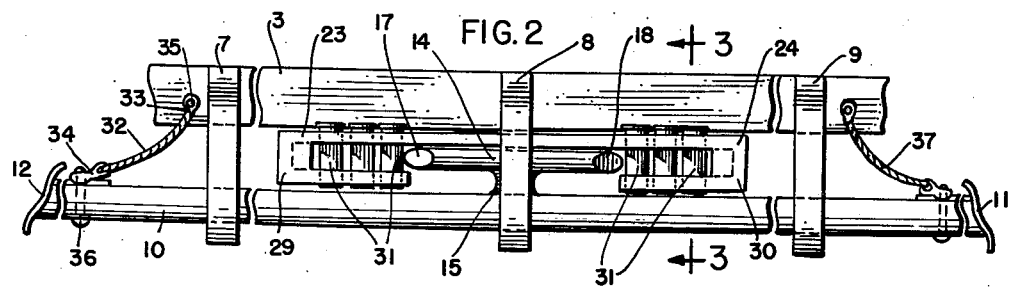
Figure 2 is a diagrammatic elevational view of a vehicle frame with one embodiment of the shock dissipating device of the invention attached thereto.
Figure 4:
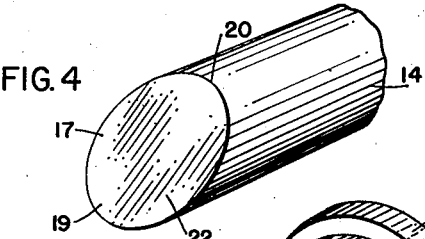
Figure 4 is an enlarged perspective view of the cutting head of a shearing member according to the invention.

Referring now to Figure 2, the details of the shearing apparatus are shown in greater detail. The longitudinal member 10 which is supported from the frame 3 by the hangers 7, 8 and 9 has attached thereto on the upper side and in substantial alignment a shearing member 14. The member 14 is positioned slightly above the member 10 and it may be integrally formed therewith or attached thereto as illustrated in Figure 2 by means of the portion 15. The member 14 is illustrated herein as being round, but it may of course be square, rectangular, triangular or oval if so desired. At the ends of the member 14 the shearing heads or hammers 17 and 18 are provided. As shown in Figure 4 the shearing head 17 has a leading edge 19 and a trailing edge 20. The surface 22 of the cutting head recedes from the knife edge point 19 to the body of the shearing member 14. The shape of the shearing heads is important for discharging sheared pins from the channel as will be described in detail hereinafter.

Figure 3:
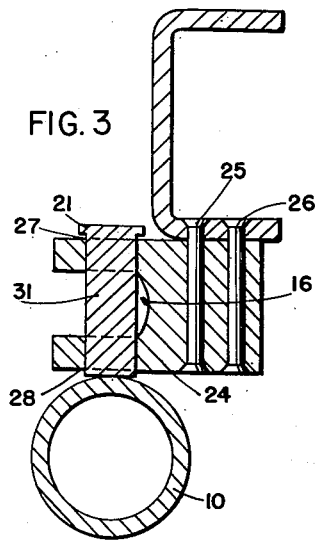
Figure 3 is an enlarged cross-sectional view taken along the lines 3—3 of Figure 2.

A pair of blocks or channels 23 and 24 are located at suitable positions beneath the longitudinal channel member 3 and are attached thereto by means of a series of bolts 25 and 26 (Fig. 3). The blocks are designed with enlarged ends or anvils 29 and 30 which are preferably triangularly shaped in order to correspond with the wedge shaped head on the shearing hammers 17 and 18. Of course if the hammers 17 and 18 are of different shape than triangular, it will be understood that the anvils 29 and 30 should be designed to complement them and receive them.

The space provided between the anvils 29 and 30 and the shearing hammers 17 and 18 contains shearable members 31 in such a way as to block the passage of the shearing member 14 against any impact which is not sufficient to shear one of the shear-resistant members 31. In this form it will be seen that a more or less rigid association has been effected between the automobile frame 1 and the cradle formed by the longitudinal members 10 and 13 and the bumpers 11 and 12. So long as the impact against the bumpers 11 and 12 does not exceed the shear resistance of a member 31, the cradle will remain in its same relative position with the frame.

The members 31 are adapted to fit closely into holes 27 and 28 in the blocks 23 and 24 and to be held against dropping through the holes by the offset portion 21 or head on the member. As seen in Fig. 3 a space 16 is provided between the block 24 and the pin 31 to receive the point 19 of the hammer. As force is applied to the shearing member 14 the hammer advances into the opening 16 and cuts through the member 31 in a blanking operation. The central portion of the shearable member is blanked out and expelled from the block 24.

Assuming now that the impact against the bumper 11 is of great magnitude, such as the impact of an automobile travelling at 60 miles an hour against an immovable object. The impact will be transmitted through the longitudinal member 10 to the shearing member 14 which will in turn be advanced to the left in Figure 2 until it strikes the shearable members 31. The force of the impact being greater than the shear resistance of a member 31, the head 17 of the shearing member 14 will cut through the member 31 and discharge it to the side. In so doing a certain amount of the original impact force will be dissipated and the residual amount will be brought to bear against the second of the shearable members 31. The shearing process is repeated with the loss of another increment of the original impact force. The shearing process may be repeated again and again until the impact force is fully dissipated or until all of the shear-resistant members 31 have been cut and the hammer 17 approaches the anvil 29.

In order to preserve the shearing member 14 and the block 23 and to protect it against destruction due to an extremely large impact force, it is desirable to provide means for interrupting the advance of the member 14 before it strikes the enlarged end 29 with damaging force. This is achieved according to the invention by the provision of a snubbing action between the frame 3 and the longitudinal member 10 and specifically by the provision of a cable 32 which is attached at one end to the frame 3 and at the other end to the longitudinal member 10 by means of conventional cable connections 33 and 34 and the bolts 35 and 36. The cable 32 is selected of such length that it remains slack through most of the shearing action but becomes taut and exerts a snubbing action when the shearing head or hammer 17 has cut through the last of the members 31 and approaches the enlarged end or anvil 29. In this manner damaging contact between the hammer 17 and the anvil 29 is prevented. If desired the cables may be attached to the bumpers 11 and 12 instead of to the longitudinal members 10 and 13.

The above description of the operation of the shock dissipating device applies in an identical manner when an impact is received by the bumper 12. It will be understood of course that the movement of the longitudinal member 10 and the shearing member 14 will be in an opposite direction and that the cable 37 will exert its snubbing action in time to prevent damaging of the shearing hammer 18 against the enlarged anvil 30.

The illustration in Fig. 2 is diagrammatic and it should be understood that the position of the shearing member 14 beneath the frame may be adjusted as conditions dictate. For example, the forward set of pins 31 may be located in front of the center of gravity of the vehicle and the rear set behind the center of gravity. The actual location of the shearing machine will depend upon the center of gravity, the location of the motor and other similar considerations.

Figure 5:
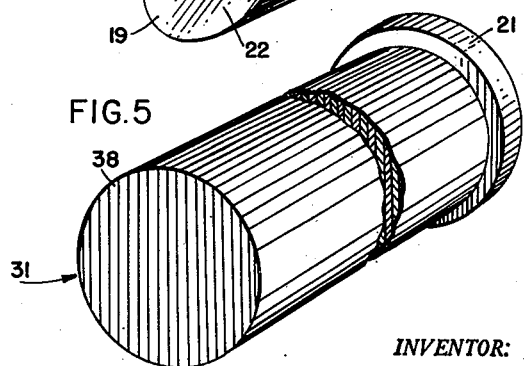
Figure 5 is an enlarged perspective view of one embodiment of the shear-resistant member according to the invention.

With reference to Figure 5 there is illustrated one embodiment of a shearable member which has been referred to in Figures 2 and 3 as the member 31. In this embodiment a plurality of thin metal strips 38 are bonded together by any suitable means such as by pressing them together or by banding them with a sheet metal band or by arranging them in a container. The laminated metal element thus prepared may of course be round, square, rectangular or oblong and is shown herein as being round only for purposes of illustration. Certain advantages are obtained by using the laminated structure in place of a solid piece of metal since the resistant action of one lamination against the other helps to dissipate the force of the impact. A simpler and less expensive item which may be used in the practice of the invention is a replaceable element of iron or steel in any shape suitable for insertion between the shearing hammers and the anvils. It is also contemplated that bundles of wire may be bound and cut into shearable members of the type disclosed for the invention. Again it may be possible to use laminations of heavy paper or plastic or wooden articles where it has been determined that the shear resistance of these articles will be sufficient to absorb or dissipate the expected impact.

As a purely illustrative example it may be assumed that the total force of an impact will not exceed 200,000 foot pounds. If ten replaceable shearable members are positioned between the shearing heads and the blocks and each of the members has been selected to have a shear resistance of 20,000 foot pounds, it will be apparent that the total force of the impact will be dissipated in cutting through all of the shearable members. It will also be apparent that even though the force of the impact is 200,000 foot pounds at the bumper of the automobile, the maximum force transmitted to the body of the automobile will be that amount required to cut through one of the shearable members. In other words, only 20,000 foot pounds is transmitted to the body of the automobile, a comparatively light shock. If desired, the device may be adapted to use 20 shearable members each having a shear resistance of 10,000 foot pounds or any other suitable combination may be worked out for dissipating the total expected force of the impact. Pins of gradually increasing shear resistance may be employed.

While the invention has been illustrated herein as applicable to an automobile, it has not been intended that the invention should be so limited. The invention is equally applicable to railroad cars and engines, to busses, trucks, tractors and other automotive vehicles. The device can likewise be applied to ships and aircraft with only the necessary adaptations which will be suggested to one skilled in the art. It is also contemplated that the invention may be applicable to any situation in which it is desirable to absorb an instantaneous impact or to dissipate the impact before it can be transmitted to the body of a moving object. For example, it may be possible to provide an outer shell which is separated from an inner cartridge by the shock dissipating device of this invention. The cartridge may be loaded with supplies, such as food and clothing and the article dropped from an aircraft. When the shell strikes the earth, the shock will be dissipated through the device of this invention and only the relatively small amount of impact necessary to cut through one shearable member will be transmitted to the cartridge.

Numerous other objects, advantages and embodiments of this invention will be suggested to those skilled in the art and it is contemplated that such embodiments all represent a part of this invention provided that they come within the scope of the appended claims.

The invention is hereby claimed as follows:

1. A shock dissipating device for a vehicle which comprises an impact receiving member mounted on said vehicle adjacent one end thereof, an impact receiving member mounted on said vehicle adjacent the opposite end thereof, an elongated member connecting said impact receiving members in an impact receiving assembly, said assembly being movably mounted on said vehicle for longitudinal reciprocation, a shearing member fixed to said assembly, and a plurality of shearable members fixed to said vehicle and opposed to said shearing member for shearing successive shearable members upon an impact on either of said impact receiving members thereby dissipating at least part of the force of said impact.

2. A shock dissipating device for a vehicle which comprises an impact receiving member mounted on said vehicle adjacent one end thereof, an impact receiving member mounted on said vehicle adjacent the opposite end thereof, an elongated member connecting said impact receiving members in a rigid impact receiving assembly, said assembly being movably mounted on said vehicle for longitudinal reciprocation, a shearing member fixed to said assembly, a plurality of shearable members fixed to said vehicle and opposed to said shearing member for shearing successive shearable members upon an impact on either of said impact receiving members thereby dissipating at least part of the force of said impact, and snubbing means connecting said assembly and said vehicle for limiting the movement of the assembly in the direction of said impact.

3. A shock dissipating device for a vehicle which comprises an impact receiving member mounted on said vehicle adjacent one end thereof, an impact receiving member mounted on said vehicle adjacent the opposite end thereof, an elongated member connecting said impact receiving members in an impact receiving assembly, said assembly being movably mounted on said vehicle for longitudinal reciprocation, a shearing member fixed to said assembly and having longitudinally directed working faces at opposite ends thereof, and a plurality of spaced replaceable shear pins mounted on said vehicle in fixed positions and aligned longitudinally opposite each said working face and in the path thereof, whereby an impact on either of said impact receiving members causes said shearing member to shear successive shear pins in its path thereby dissipating at least part of the force of said impact.

4. A shock dissipating device for a vehicle which comprises a bumper mounted on said vehicle forwardly thereof, a bumper mounted on said vehicle rearwardly thereof, an elongated member connecting said bumpers in an impact receiving assembly, said assembly being movably mounted on said vehicle for longitudinal reciprocation, an elongated shearing member fixed to said connecting member and longitudinally reciprocatable in a channel member fixed to said vehicle, said shearing member having at opposite ends thereof longitudinally directed working faces inclined with respect to a plane normal to the longitudinal axis of the member, a plurality of spaced replaceable shear pins mounted in said channel member in fixed positions and aligned longitudinally opposite each said working face and in the path thereof, whereby an impact on either of said bumpers causes said shearing member to shear successive shear pins in its path thereby dissipating at least part of the force of said impact, and at least one snubbing connector extending forwardly and at least one snubbing connector extending rearwardly from said vehicle to said assembly and connecting the vehicle and the assembly for limiting the movement of the assembly in the direction of said impact.

References Cited in the file of this patent

UNITED STATES PATENTS

| | | |
|---|---|---|
| 994,531 | O'Connor | June 6, 1911 |
| 1,020,445 | Potter | Mar. 19, 1912 |
| 1,655,978 | Vella | Jan. 10, 1928 |
| 1,691,398 | Long | Nov. 13, 1928 |
| 1,754,104 | Hoffman | Apr. 8, 1930 |
| 1,799,065 | Rohm | Mar. 31, 1931 |
| 1,998,388 | Scharfenberg | Apr. 16, 1935 |
| 2,022,253 | Nortz | Nov. 26, 1935 |
| 2,401,748 | Dillon | June 11, 1946 |
| 2,510,815 | Granche | June 6, 1950 |
| 2,557,105 | Hight | June 19, 1951 |